INVENTOR.
NORMAN O. SCHWARTZ
BY Ralph L. Wrugger
ATTORNEYS

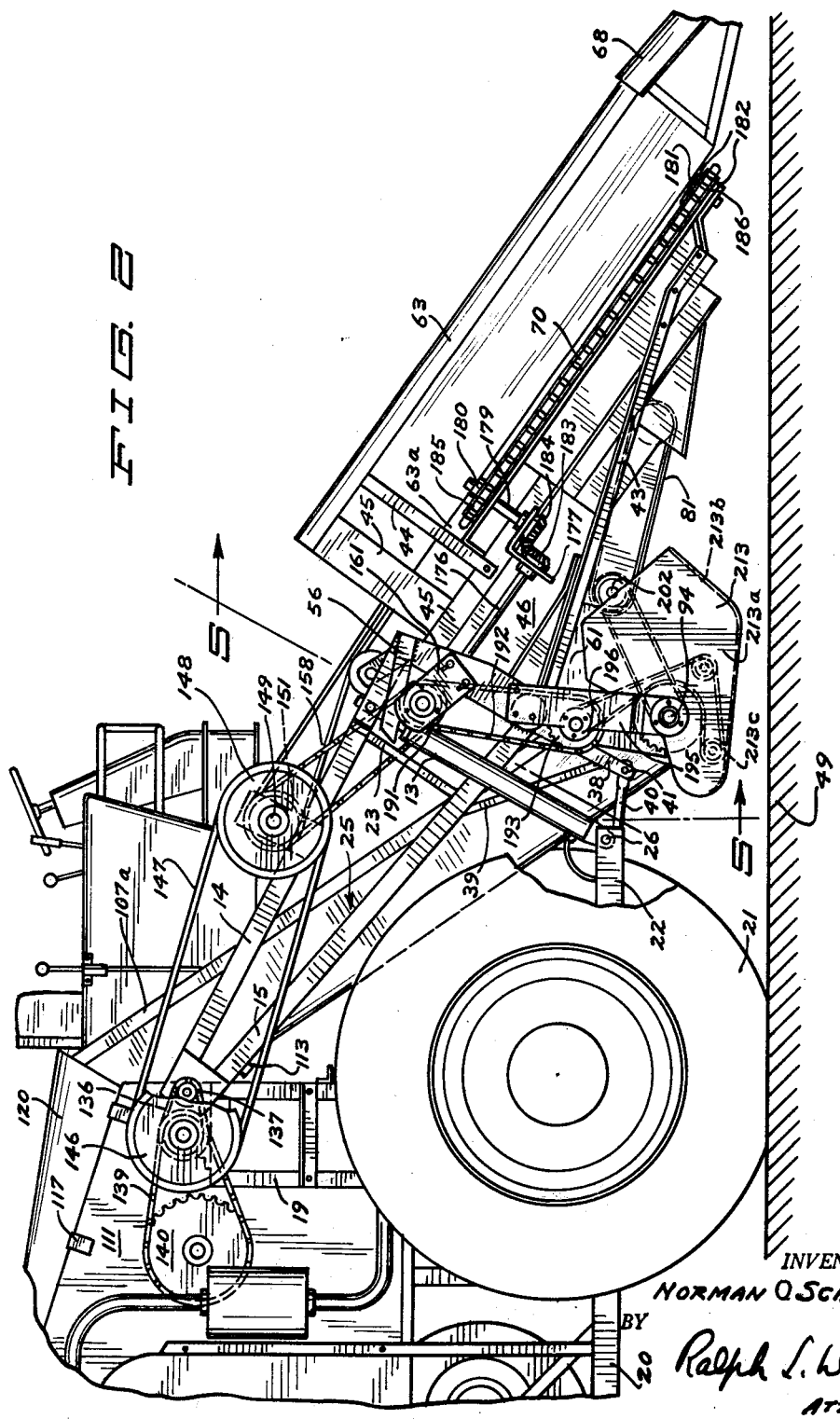

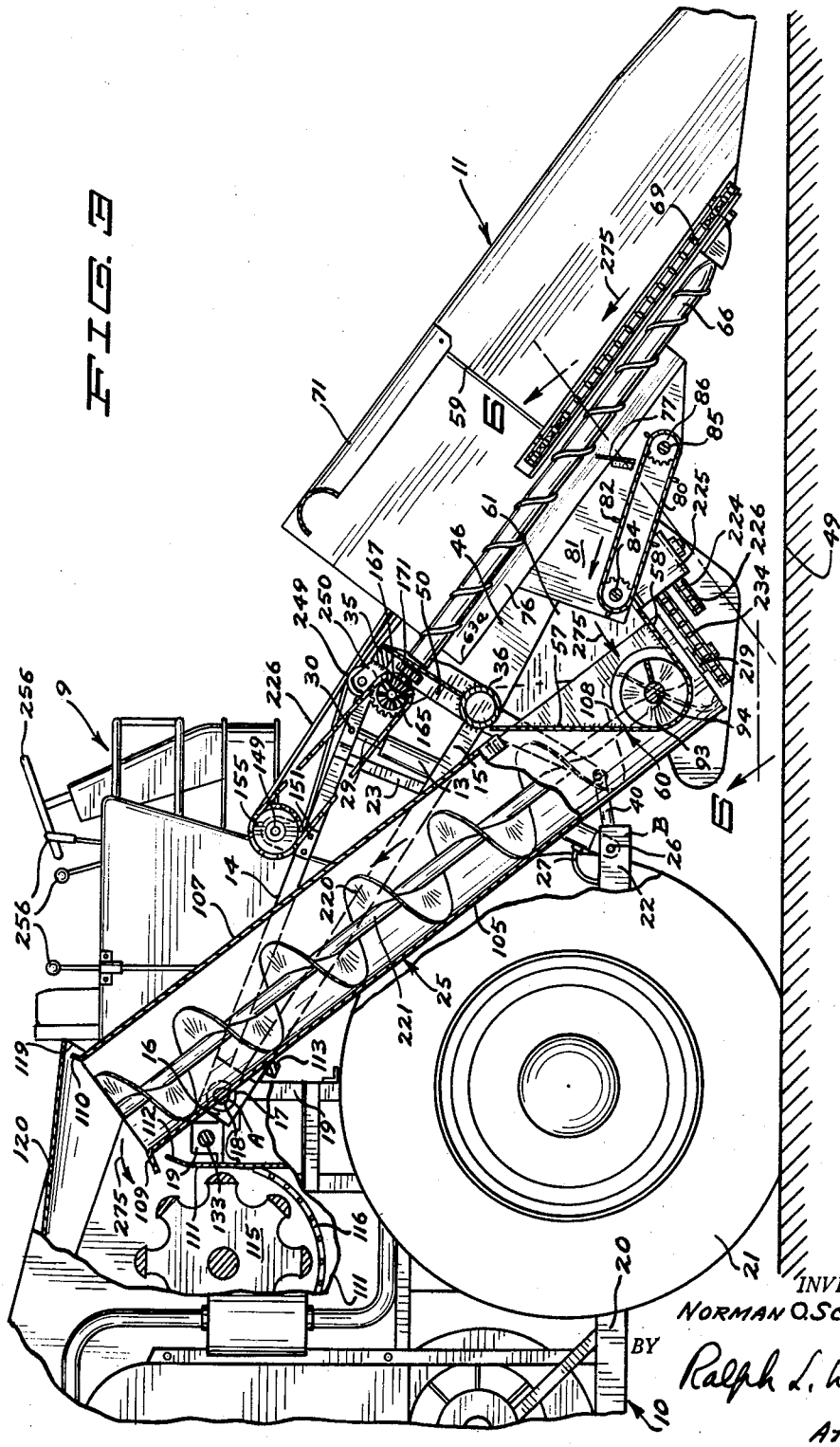

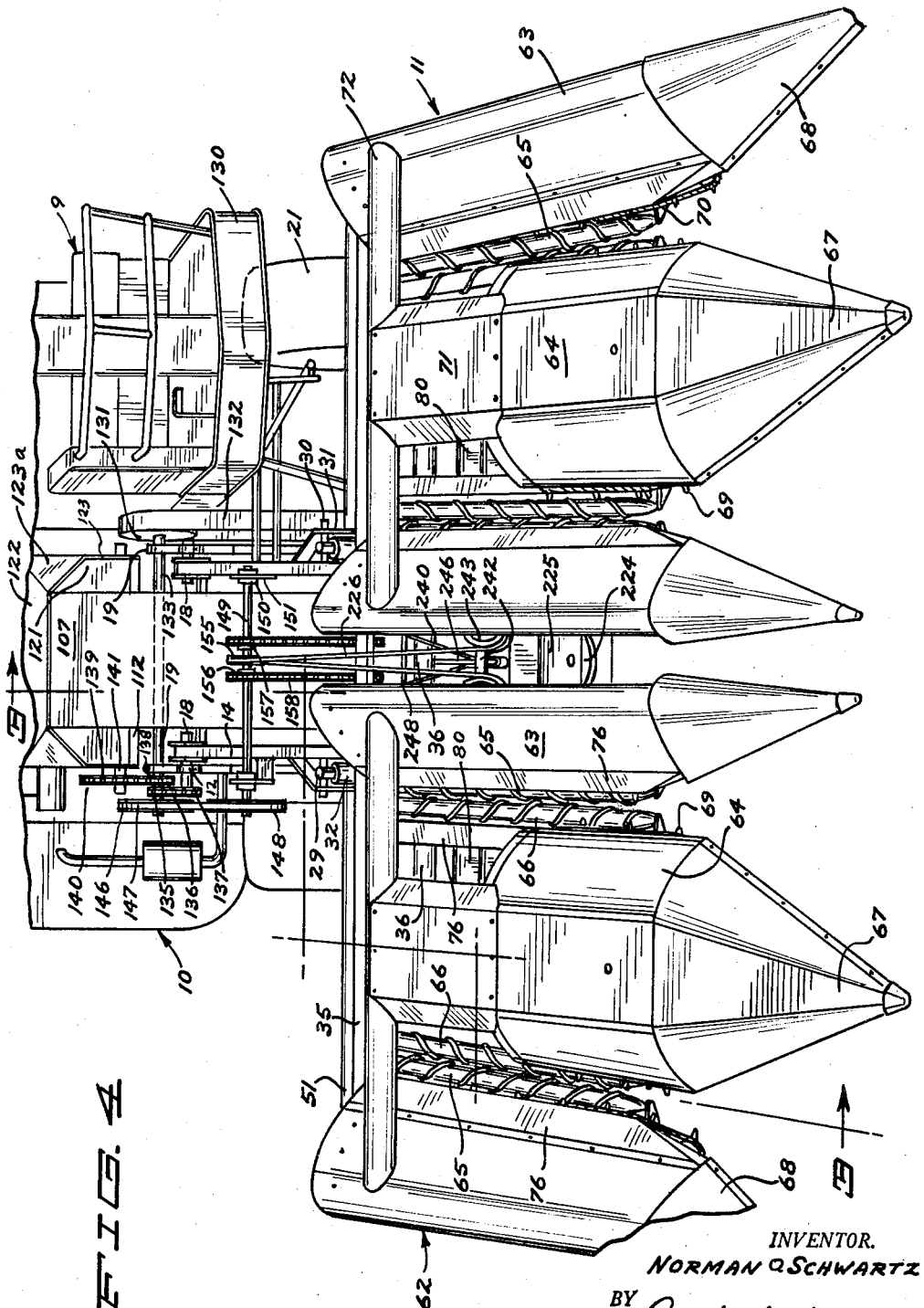

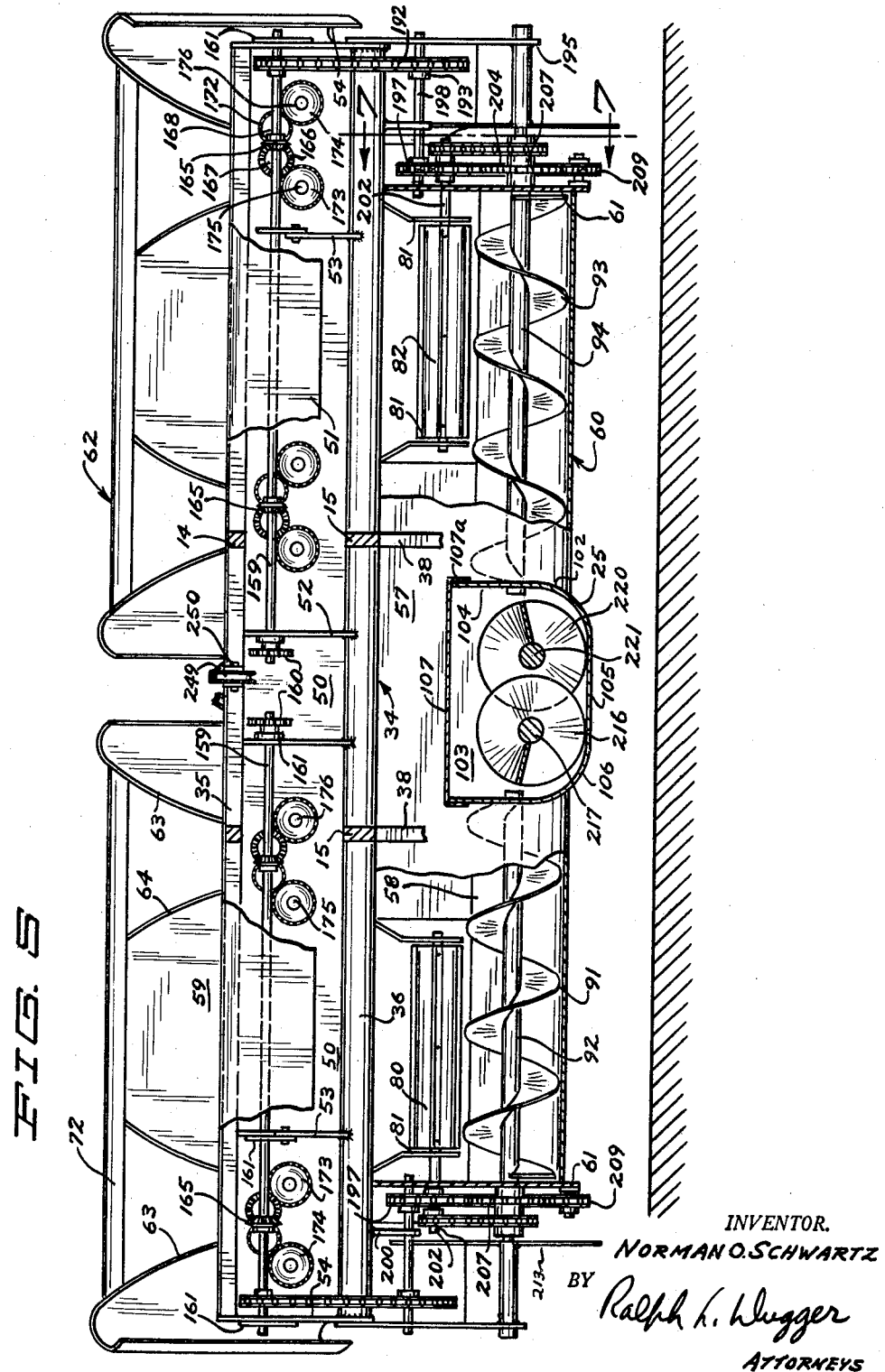

Jan. 1, 1963  N. O. SCHWARTZ  3,070,939
CORN PICKER
Filed Oct. 8, 1958  6 Sheets-Sheet 6
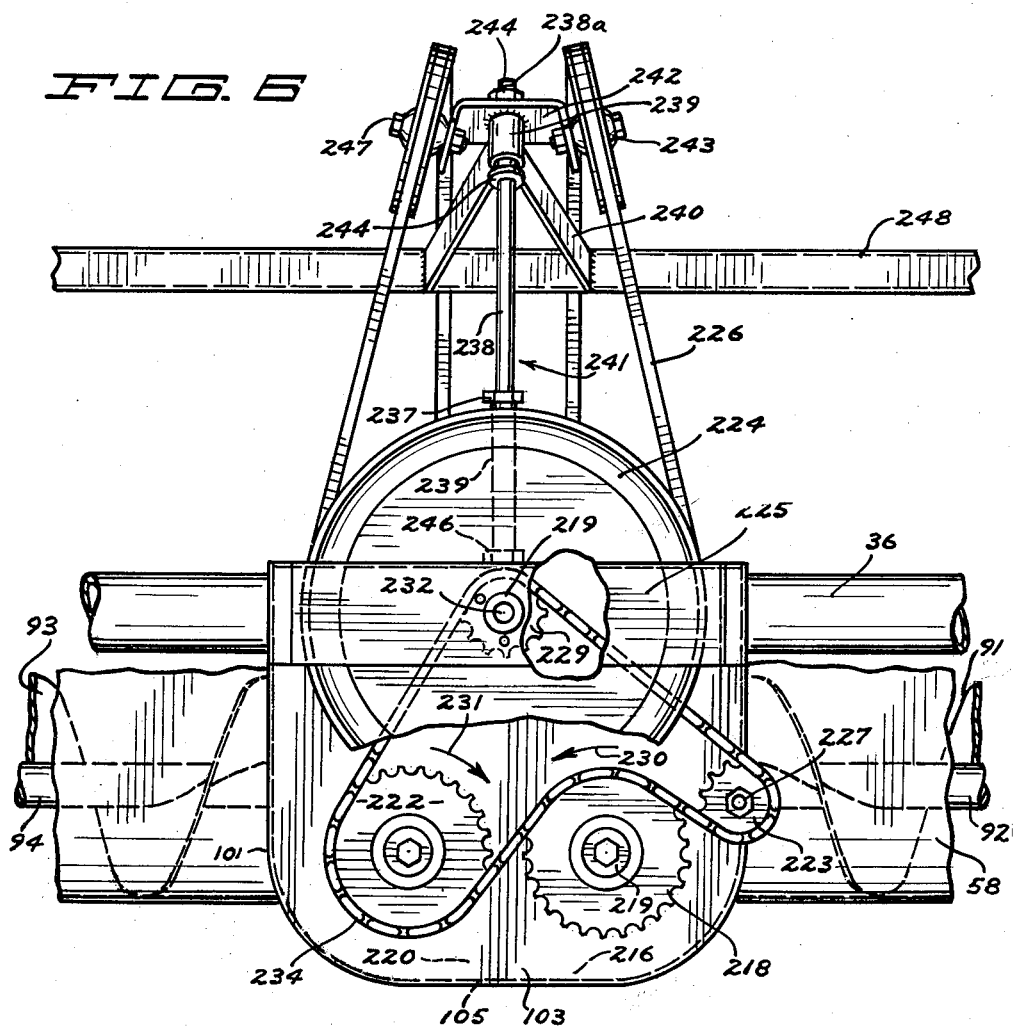
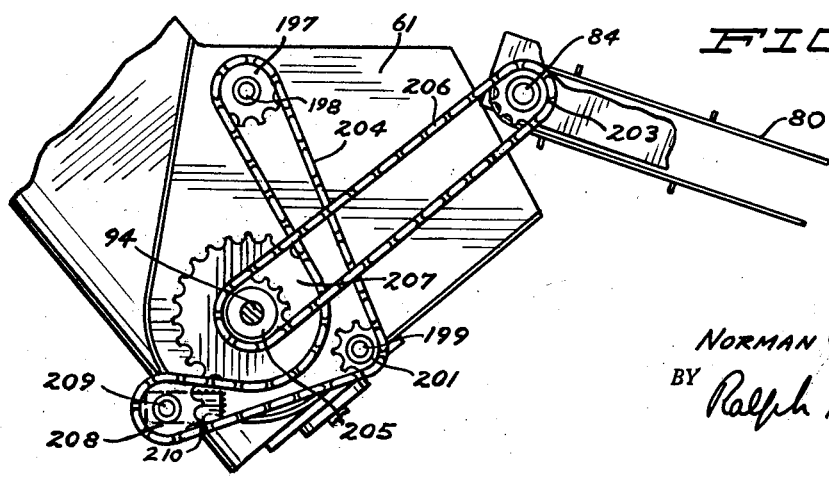
INVENTOR.
NORMAN O. SCHWARTZ
BY Ralph L. Klugger
ATTORNEYS

United States Patent Office 3,070,939
Patented Jan. 1, 1963

3,070,939
CORN PICKER
Norman O. Schwartz, Lester Prairie, Minn.
Filed Oct. 8, 1958, Ser. No. 766,033
4 Claims. (Cl. 56—18)

This invention relates to new and novel apparatus for picking corn. More particularly, this invention relates to apparatus for simultaneously picking four rows of corn and elevating the picked corn up to the cylinder of a conventional combine.

One of the objects of this invention is to provide a new and improved corn picker sheller apparatus that picks two or more rows of corn simultaneously. A further object of this invention is to provide a new and novel corn header attachment that simultaneously picks more than two rows of corn, said attachment to be used in conjunction with a conventional combine. A still further object of this invention is to provide a corn header attachment for a combine that is capable of simultaneously picking four rows of corn and having means for elevating the corn from the snapping rolls to the cylinder without any corn being lost from the time the corn falls on the conveying means adjacent the snapping rolls until it enters the sheller cylinder.

Still another object of this invention is to provide a corn header attachment for simultaneously picking four rows of corn, said header attachment including two substantially identical header portions, each capable of picking two rows of corn. Still an additional object of this invention is to provide a pair of two row header attachments cooperatively feeding into a single sharply inclined elevator means for carrying the corn from adjacent the ground to the sheller cylinder of a conventional combine.

Still another object of this invention is to provide a new and novel four row corn header attachment having a pair of similar header portions including a conveyor belt, transverse augers, and two sets of cooperating snapping rolls, one set being mounted on either side of the conveyor belt which carries the picked corn thereon to a pair of transverse augers, said transverse augers working the corn inwardly toward one another to carry a common elevating means for elevating the corn to the sheller cylinder of a combine with which the attachment is to be used with.

Still a further object of this invention is to provide a four row corn picker attachment having means for elevating the ears of corn from the snapping rolls thereof to the sheller cylinder of a combine, said means including a pair of conveyor belts, a pair of transverse augers for receiving the corn from the conveyor belts and moving the corn to a point intermediate said belts, and a pair of double elevating augers for receiving the picked corn from the transverse auger and for lifting the corn from adjacent the ground level to the sheller cylinder. There is also to be provided means for driving the snapping rolls, conveyor belts, transverse auger and elevating auger in timed relationship.

Still an additional object of this invention is to provide a four row corn header attachment having a carrying elevating system for taking the corn from the snapping rolls and elevating it to a sheller cylinder, said system including endless belts that gather the corn as it falls off the snapping rolls, transverse means for moving the corn inwardly to a common elevating means, and elevating means for lifting the corn from the adjacent ground level to the sheller cylinder wherein the belts receive corn from the upper two-thirds of the snapping rolls when the lower end of the snapping rolls are adjacent the ground and the elevating means receives the corn below the horizontal level of the belts.

Still a further objective of this invention is to provide a corn header attachment having carrying means and elevating means for transporting the corn from the snapping rolls to a sheller cylinder, said elevating means being inclined at an angle greater than 45° to the horizontal. Still another objective of this invention is to provide an improved conveyor system for taking picked corn from the snapping rolls of a four row corn header attachment to the sheller cylinder, said conveyor system including a pair of spaced horizontal belts, a transverse auger for moving the corn from the horizontal belts to elevating augers, and a pair of elevating augers turning in opposite directions and inwardly toward one another for elevating the corn from adjacent the ground to the corn sheller cylinder.

A further object of this invention is to provide a four row corn header attachment including a transverse frame that extends outwardly beyond either side of a grain combine which may be readily attached to said grain combine once the grain header has been removed. Still another object of this invention is to provide apparatus for alternately being usable for combining grain, and by replacing a grain header attachment with a corn header attachment may be used for simultaneously picking the four rows of corn wherein a single drive member is needed for making a drive connection between drive means for the moving elements of said attachment and an appropriate drive connection on the combine.

Other and further objects are those inherent in the invention herein illustrated, described in the claims, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the corresponding numerals refer to the same parts and in which:

FIGURE 2 is an enlarged fragmentary side elevational view of a combine with the corn header of this invention mounted thereon, said attachment being shown in a lowered position;

FIGURE 3 is an enlarged fragmentary side elevational view of the corn picker of this invention, said view being taken along the line and looking in the direction of the arrows 3—3 of FIGURE 4 to illustrate the conveyor means for receiving the picked corn from the corn stalks and transporting the picked corn to the elevating means which elevate the corn to the sheller cylinder;

FIGURE 4 is a fragmentary three-quarter front view of the corn picker of this invention, said view showing the four row corn header attachment and part of the drive means for the mechanically moving parts.

FIGURE 5 is an inclined sectional view of the corn header attachment taken along line and looking in the direction of the arrows 5—5 of FIGURE 2 to illustrate the transverse frame, the transverse augers, and the drive connections for the snapping rolls and said transverse auger;

FIGURE 6 is an inclined fragmentary front sectional view of the corn header attachment taken along the line and looking in the direction of the arrows 6—6 of FIGURE 3 to show the mechanism for driving the elevating augers and for adjusting the position of a portion of the drive means;

FIGURE 7 is an enlarged fragmentary side sectional view of the corn header attachment taken along the line and looking in the direction of the arrows 7—7 of FIGURE 5 to show the transverse auger and belt drive connections.

Figure 1:
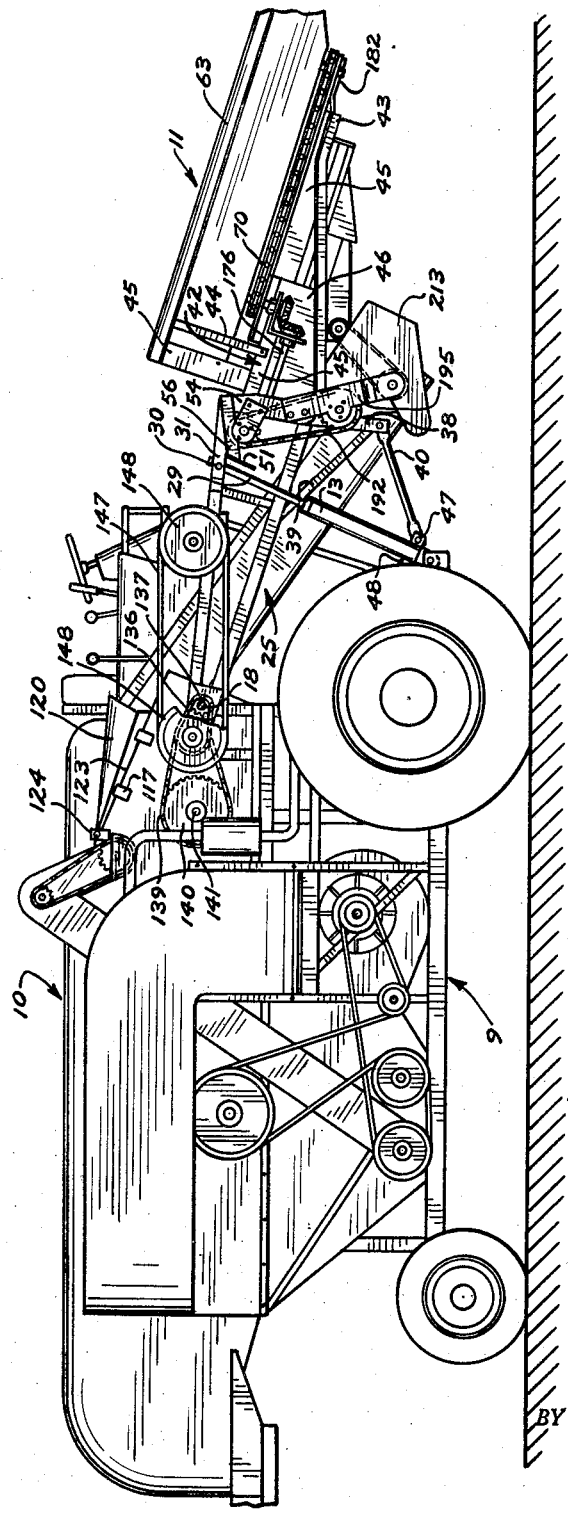
FIGURE 1 is a side elevational view of a combine with the corn header attachment of this invention mounted thereon, said corn header attachment being shown in an elevated position.

Referring to the drawings and in particular to FIGURES 1 and 4 there is shown a side elevation of the corn picker and a front view respectively of the four row corn header attachment of this invention, the corn picker being generally designated 9 and the corn header attachment being generally designated by 11. The corn picker unit as illustrated and described herein is made up of a combine 10 having the four row corn header attachment mounted thereon. The combine 9 is a self propelled wheeled vehicle of conventional construction which is used for harvesting grain, corn, beans, seeds, and grasses, said combine being adapted to have either a corn picker attachment or a grain header attachment mounted thereon. Since the combine is of conventional construction it will not be described in any greater detail than is necessary to set forth the mounting, the means for driving the operating parts of the corn attachment along with the structure of the combine to which the corn is fed from said corn header attachment.

Referring now in particular to FIGURE 4 the structure mounting the corn header attachment on the combine and the frame structure of the corn header attachment will now be set forth. The main connection points for connecting the header attachment to the combine, designated by reference letters A and B, are locations of structure for attaching the attachment to the combine, A being the point about which the corn header attachment is pivotally mounted for pivoting it between a "lower" and a raised position, and B being the point to which the hydraulic cylinder 13 for raising and lowering the attachment is pivotally connected to the combine.

The main chassis 20 of the combine has a pair of sub-frames 19 secured thereto in the area of the front wheels 21 to extend above said wheels. The aforementioned sub-frames 19 are spaced apart a sufficient distance to permit the generally rectangular elevating auger housing 25 and other structure described hereinafter to be mounted between said sub-frames. Each of the sub-frames has an appropriate main pivot bracket 12 mounted on the upper end portion thereof so that a horizontal main pivot rod 18 may be secured therein. On each of the main pivot rods a hub 17 is pivotally mounted. To the hubs 17 there is secured a pair of spaced brackets 16 to extend forwardly from said hubs to secure a pair of longitudinal frame bars 14, 15 thereto.

The upper longitudinal frame bar 14 is secured to the bracket to extend forwardly to diverge from the lower longitudinal frame bar which is also secured to said bracket to extend forwardly therefrom. To the forward end portions of the upper and lower longitudinal frame bars is the transverse frame 34 of the corn header attachment, said transverse frame to be described in greater detail hereinafter.

To the forward end portions of each of the two longitudinal chassis members 22 which extend forwardly of the wheels 21, there is pivotally secured a hydraulic cylinder 13. The hydraulic cylinder is mounted on the pivot pin 26 which is journalled in said chassis member, said cylinder extending in an upward and slightly forward direction. A hose 27 is provided to fluidly connect the cylinder to an appropriate fluid pump (not shown). The upper end piston rod 29 of the cylinder 13 is connected to a horizontal piston rod pivot 30 by a piston rod clamp 32. The piston rod pivot is journalled for rotation in appropriate apertures formed in the upper longitudinal frame bar and the piston rod pivot rod plate 31 which is connected to said frame bar, said pivot plate having a bent portion which is parallel to the frame and spaced therefrom. The aforementioned piston rod pivot connection is located a relatively short distance from the transverse frame 34 in comparison to the distance from said pivot connection to the main pivot rod 18.

The transverse frame 34 includes an elongated transverse beam 36 and an elongated transverse frame cross bar 35, said cross bar and beam extending outwardly beyond either side of the axle mounting the front wheels 21 and being parallel thereto. Depending braces 38, each having a longitudinal axis which extends in the same plane as the beam, are secured to said beam to depend therefrom. A diagonal brace 39 which is secured to the lower end of the depending brace extends upwardly and rearwardly to be connected to the lower frame bar 15 adjacent the area of the bar which is in close proximity of the cylinder. An upright brace 23 is connected to the lower frame bar adjacent the connection of the diagonal brace to extend upwardly therefrom to be secured to the upper frame bar 14 rearwardly of the pivot plate 31.

A mechanical linkage connects the lower end of each of the depending braces to appropriate mechanism which includes a crank arm 48. The crank arm 48 is mounted to pivot about a mounting tube (not shown), said mounting tube being parallel to and adjacent the axis of rotation of the front wheels. A linkage arm 40 is pivotally connected to the crank arm by pivot 47 and extends forwardly therefrom to be pivotally connected to the lower end of the depending brace by pivot 41. The mounting tube and crank arms are rotated by appropriate mechanism (not shown) which is actuated at the same time as the hydraulic system including hydraulic cylinders 13 are actuated to raise or lower the corn header attachment. The aforementioned mechanical linkage facilitates raising and lowering the corn header attachment in that it forms a stabilizing system.

Referring now to FIGURE 5 the structure of transverse frame 34 will now be set forth. As previously mentioned, the transverse frame includes a pair of spaced parallel horizontal members, transverse frame cross bar 35 and transverse beam 36. The beam and cross bar are held in their spaced positions by reinforcing members comprising an end brace plate 54 mounted at either end, intermediate brace plates 53 spaced inwardly from said end plates and spaced inner brace plates 52 which are located adjacent the mid-portion of the transverse frame. The aforementioned brace plates are secured at one end to the cross bar and to the opposite end to the shaft by appropriate means such as welding. Back plates 50 are provided to fill the space enclosed by said beam, cross bars, and brace plates.

A plurality of short bars 56 are secured to the cross bar to extend rearwardly therefrom. A curved shield 51 is mounted to extend from the top portion of the cross bar rearwardly over the top of the short bars which forms supporting structures therefrom and downwardly over the rear end of said short bars. The curved shield provides a cover for preventing material from getting into the gearing mounted adjacent the back plates, and also as a safety shield, said gearing to be described hereinafter.

The structure of the transverse frame having been set forth, the corn picker units will now be described. Basically the four row corn picker attachment of this invention is made up of two two row corn picker units 62 mounted in side by side relationship on and to extend forwardly of the transverse frame 34. Each of the picker units 62 includes appropriate supporting structure, generally designated 42, which includes longitudinal braces 43, and brace plates 45 which are either directly or indirectly connected to the transverse frame and appropriate cross braces 44 which are secured to the longitudinal braces or brace plates in a conventional manner, said longitudinal braces, cross braces, and brace plates not forming a part of this invention, unless otherwise described hereinafter. An example of the type of supporting structure and other conventional structure not described that may be used may be found in United States patent to Morrison et al., 2,794,307 and other United States patents and therefore, for the most part, it will not be described.

Each of the two row picker units 62 includes a pair of spaced forwardly extending curved side shields 63, and a divider shield 64 mounted intermediate and spaced from said side shields, said side shields and divider shield being mounted on appropriate supporting members 42. To each of the side shields 63 there is attached a forwardly extending outer floating snout 68 and to the divider shield 64 there is attached an inner floating snout 67, said snouts forming structure for gathering in the downed, leaning, or tangled stalks.

A cylindrical transverse member 72 is connected at its end to the oppositely curved shields 63 at the upper rear portion of said shields. As may be noted in FIGURE 4, the divider shield 64 is generally semi-circular in a transverse section thereof and its longitudinal length is approximately one half of the length of the curved side shields. The divider shield is mounted to have its rear edge portion intermediate the central portions of the curved side shields. A hood 71 extends from the rear edge portion of the divider shield to be connected to the cylindrical transverse support member 72.

The lower rear edge portion 63a of the curved shield is connected to the back plates 50 through a connecting plate 46 which is secured to appropriate supporting members 42. The purpose of providing the connecting plates will be set forth hereinafter.

Mounted to have their rear end portions extended through appropriate apertures formed in the back plates 50 are a plurality of pairs of cooperating inner and outer snapping rolls 66, 65. The outer and inner snapping rolls 65, 66 are mounted beneath and intermediate the space between the adjacent longitudinal edges of a curved side shield 63 and divider shield 64. Also mounted beneath each of the aforementioned shields and between a snapping roll is a conventional gathering chain or chains 69, 70. The structure mounting said gathering chains and snapping rolls will be set forth in greater details hereinafter.

In each of the picker units 62, the outer snapping roll is mounted closely adjacent the curved side shield 63 and at a slightly higher elevation than the cooperating lower snapping roll. A shoulder 76 is connected to the lower edge portion of the side curved shield to overhang the gathering chain 70 and outer snapping roll. It is to be noted that the aforementioned snapping rolls, curved side shields, divider shield, and gathering chains are all mounted to form a low angle with the ground 49 when the corn picker attachment is in a lowered position such as illustrated in FIGURE 2. The low angle of the snapping rolls and gathering chains allows picking up of down and lodged corn.

Depending downwardly from the divider to a level beneath and between an adjacent pair of lower snapping rolls is a transverse inclined wall 59 to close the upper end of said divider shield 64, the upper edge portion of said inclined wall being adjacent and immediately beneath the lower edge hood 71. Extending from the end portions of the inclined wall are a pair of elongated oppositely curved belt housing plates 81, said housing plates extending from said inclined wall to the back plates 50 to overhang the transverse auger housing 60. The aforementioned housing plates 76 are curved inwardly toward one another to the level of the conveyor belt 80, and outwardly to be immediately beneath their respective lower snapping rolls 66. From adjacent the level of the belt, the housing plates extend in a vertical direction to have the conveyor belt mounted therebetween. Further, the housing plates are curved downwardly and outwardly from the lower snapping rolls so that the severed ears of corn will roll off the lower snapping rolls onto the endless belt 80. The upper snapping rolls being at a higher elevation than the cooperating lower rolls aids in directing the severed corn onto the belt.

Spaced apertures are formed in either lower end portions of the housing plates 81 so that a transverse belt drive shaft 84 and a belt shaft 84 spaced therefrom and parallel thereto may be journalled for rotation in appropriate structure located on the opposite side of said plates from said belt. Belt cylinders 86 are provided for the belt drive shaft and the belt shaft for mounting the conveyor belt thereon. The belt is sloped inwardly and upwardly along the longitudinal axis of the corn picker and the outer edge portions of the belt are very closely adjacent to the respective housing plates to prevent loss of kernels of corn therebetween.

The belt 80 has a plurality of spaced parallel ribs 82 that run the transverse width thereof. The ribs 82 extend outwardly from the belt surface to provide means for engaging the ears of corn and facilitate lifting the ears of corn.

As may be noted in FIGURE 3, the belt shaft 85 is mounted to be approximately one third of the height above ground as the upper end of the snapping rolls (when the attachment is in a fully lowered position) but at a slightly lower height and just rearwardly of said rolls. The belt drive shaft is mounted at a higher height than the belt shaft 85 to be just above and rearwardly of the forward edge of the transverse auger housing front wall 58. By providing the aforementioned ribs 82 which extend upwardly from the transverse belt the ears of corn may be taken from the snapping rolls at a relatively low elevation and moved in an upward direction to the transverse auger housing.

A belt housing front plate 77 is mounted to extend between the adjacent belt housing plates 81 and shoulder 76 to reach downwardly to adjacent the belt surface and rearwardly of the belt shaft and in an upward direction to meet the inclined wall 59, there being appropriate side apertures cut out of said front plate to allow the snapping rolls and gathering chains to be extended therethrough. The belt housing front wall extends sufficiently close to the belt so that ears of corn will not roll forwardly off the belt while at the same time the ribs 82 extend upwardly a sufficient distance to prevent the kernels of corn which may be shelled from severed ears from falling off the forward end of the belt.

As may be apparent from the preceding description, the endless belt is located beneath the hood 71 and spaced therefrom. Also the belt has a transverse width that is substantially equal to the distance between the adjacent pair of snapping rolls 66.

The structure for receiving the ears of corn from the snapping rolls and carrying it to the transverse auger housing 60 having been set forth, the structure for retaining and carrying the picked corn from the endless belt to the elevating auger housing 25 will now be described. Referring now in particular to FIGURES 3 and 5 it may be noted that the transverse auger housing is elongated to extend nearly the width of the two two row picker units 62. The auger housing is generally J-shaped in cross section, the back wall 57 forming the long arm of the J while the inclined front wall 58 forms the short arm of the J. The upper edge portion of the back wall is secured to the transverse beam 36. Each end of the auger housing is enclosed by an end wall 61 which extends downwardly from the transverse beam and is located slightly outwardly of the outermost snapping rolls of each of the two units 62.

As may be noted from FIGURE 3 the front wall 58 is formed integral with the back wall 57, said walls being curved at their junction to rotatably mount a pair of spaced transverse augers 91, 93 having a common axis of rotation therein. An appropriate aperture is formed in the left end wall 61 so that the transverse auger shaft 92 of the transverse auger 91 may be extended outwardly therethrough. Similarly an appropriate aperture is formed in the opposite end wall 61 so that the transverse auger shaft 94 of the transverse auger 93 may be rotatably extended therethrough. Each of the transverse augers extend inwardly from their respective end walls to just beyond the respective vertical planes of the vertical walls 104 of the elevating auger housing 25.

A generally trapezoidal belt opening 95 having a width slightly larger than the belt 80 is formed in each end portion of the transverse auger housing front wall 58 so that a portion of said belt may be extended therethrough. The lower edge of the aforementioned trapezoidal opening 95 is at nearly the same elevation as the top of the transverse augers. The opening extends upwardly to allow the belt housing plates 81 to be extended therethrough as previously mentioned to overhang the respective transverse augers 91, 93.

The transverse auger housing having been described, the structure forming the elevating auger housing 25 will now be set forth. The elevating auger housing 25 in conjunction with the transverse auger housing 60 forms a generally T-shaped housing member with the transverse auger housing being the cross bar of the key.

The transverse auger housing and the elevating auger housing both are made of rigid members which will support the respective augers mounted therein and also form rigid structure on which other members of the corn header attachment may be mounted and secured to. It is to be noted that in the drawings and in the description set forth herein that various bracing structure for reinforcing the corn picker unit is not illustrated or described, said structure being of a geneal nature as that shown in the United States patent to Morrison et al. 2,794,307 and in other United States patents.

Referring now to FIGURES 3, 5, and 6 in particular, it may be noted that the elevating auger housing 25 has a generally rectangular shaped cross section and is extended through auger housing aperture 101 and 102 formed in the front wall 58 and back wall 57 respectively of the transverse auger housing. The elevating auger housing extends slightly forward of and to a lower elevation than the transverse auger housing to have an end wall 103 which is substantially parallel to the front wall 58 and slightly forward thereof.

The elevating housing 25 in addition to having an end wall 103, has a pair of spaced elongated vertical walls 104, a bottom wall 105 and a cover 107. Each of the vertical walls is formed integral with the respective edge portions of bottom wall 105 through appropriate curved portions 106. The cover 107 has vertical flange portions 107a that are formed integral therewith and at right angles thereto to be in engaging or binding relationship with the upper edge portion of the respective vertical walls. The cover prevents the corn stalks and other miscellaneous items from falling into the elevating housing.

A circular aperture 108 is formed in the lower end portion of each of the vertical walls 104. Each of the circular apertures has a diameter slightly larger than the respective augers 91, 93 which are extended therethrough and has a central axis which coincides with the elongated axis of said augers.

When the corn picker attachment is in a lowered position such as shown in FIGURE 3, the lower forward edge of the elevating auger housing is located slightly above the ground level to extend below the transverse auger housing. From the transverse auger housing, the elevating auger housing extends upwardly and rearwardly at an angle greater than 50° to feed into the sheller cylinder casing 11. Of course it is to be understood the angle would depend on the combine that the attachment is to be used with. Mounted within the sheller cylinder casing are a sheller cylinder 115 and a cylinder grate 116. The aforementioned sheller cylinder and cylinder grate are conventional parts that form no part of this invention and therefore they will not be described in any detail.

The sheller cylinder casing has a forwardly and upwardly extending lip 112 that extends beneath the curved flange 109 which is formed integral with the upper edge of the bottom wall 105 of the auger housing. The housing extends upwardly and rearwardly over the short cross brace 113 that is joined on either end to a longitudinal frame bar 15 and into the sheller cylinder casing opening 119.

An inclined flange 110 is formed integral with the upper edge of the cover 107 to extend outwardly from said cover toward the sheller cylinder casing enclosure member 120 and immediately adjacent thereto. By providing the aforementioned flanges 109, 110, the lip 112, and the closure member 120, the upper end of the elevating housing may be pivoted about point A when the corn picker attachment is raised or lowered and still at the same time provide structure to eliminate the loss of corn between the elevating housing and the sheller cylinder casing irrespective whether the corn picker attachment is in a raised position, a lowered position, or a partially raised position. At the same time by providing the special closure members 120, the path of travel of the corn (arrow 275) passes from said elevating housing to the sheller cylinder casing without being substantially reduced in cross sectional area even though the corn header attachment is set in different positions between a fully raised and a fully lowered position.

The closure member 120 is made up of a top portion 122 having a transverse width greater than the width of the elevating auger housing, side portions 123 formed integral with the top portion, said side portions including an inclining triangular section 123a which slants upwardly and inwardly to the top portion and wings 121 which are connected to the forward edges of the inclined portions 123a and the side portion 123. The aforementioned wings 121 extend inwardly within close proximity to each vertical wall 104 of the elevating housing and forwardly of the inclined flange 110 which extends outwardly from said vertical walls. The wings also extend downwardly from the top portion 122 to be closely adjacent to the lip 112 and slightly rearwardly thereof.

The closure member 120 is hingedly mounted on the cylinder casing 111 by appropriate hinges 124. A plurality of spaced clips 117 are connected to the side portions 123. A space is left between the lower end portions of the clip and the side portions so that the upper portion of the walls of the cylindrical casing 111 may be clipped therebetween. In other words, the aforementioned clips 117 in conjunction with the side portions 123 hold the upper portion of the wall of the cylinder casing 111 in tight frictional engagement therebetween. The provision of the closure member 120 in addition to retaining the corn in the cylinder casing also has an added advantage in that when the combine runs over a bump and if the upper end of the elevating housing should be bounced in an upward direction, the closure member would be pivoted about its hinge 124 and thus would decrease the possibility of any damage to the corn picker.

The structure of the corn header attachment having been described, the structure forming the driving connections between the various moving mechanical parts will now be set forth. The combine 10 is self propelled, and the "running" units are driven by a motor (not shown) located beneath the operators stand 130.

The main drive belt 132 drivenly connects the main drive pulley 131 to the motor. The drive pulley 131 is keyed on one end of the main drive shaft 133 which is journalled in appropriate mounting structure (not shown) mounted on the combine chassis members 19. The aforementioned main drive shaft is mounted to be beneath the upper end of the elevating auger housing and extend transversely outward beyond either side thereof.

On the opposite end of the main drive shaft from the main drive pulley and spaced from the vertical wall of the elevating housing is a small drive sprocket 135. A drive chain 136 drivenly connects the drive sprocket to the sprocket 137 which is rotatably mounted on the main pivot rod 18. An eccentric arm (not shown) connects the sprocket 137 to conventional cleaning and separating mechanism located in the combine.

Mounted inwardly from the small drive sprocket 135 and adjacent the vertical wall is a cylinder drive sprocket 138. A drive chain 139 drivenly connects the cylinder drive sprocket to the large cylinder sprocket 140. The cylinder sprocket is keyed on the end of the cylinder shaft 141 which extends inwardly through the sheller cylinder casing wall 111 to rotatably mount the sheller cylinder 115. An appropriate idler sprocket (not shown) may be provided in the driving connection between sprockets 140 and 136.

A header drive pulley 146 is mounted on the main drive shaft outwardly from the aforementioned cylinder drive sprocket 138. The drive pulley 146 drives the pulley 148 through a V-belt 147. The pulley 148 is keyed on one end of the header shaft 149. The header shaft 149 extends transversely across the elevator auger housing and is journalled for rotation in bearings 150 which are mounted in the upper end of spaced mounting brackets 151. A mounting bracket 151 is mounted on each upper longitudinal frame bar 14 approximately midway between the pivot point A and the transverse cross bar 35.

Mounted on the central portion of the header shaft 149 to rotate therewith is an elevating auger drive pulley 155. The pulley 155 drives the elevating augers through mechanism to be described hereinafter. Mounted on the header shaft on either side of the elevating auger drive pulley are picker unit drive sprockets 156, 157. The drive sprocket 157 drives the snapping rolls, the gathering chains, and the endless belt of the lefthand two row picker unit 62. The picker unit drive sprocket 156 drives similar elements in the righthand two row picker unit 62 as those driven by drive sprockets 157 in the lefthand picker unit. The drive sprockets 156, 157 through their respective picker unit drive chains 158 each drive an end sprocket 160. Each end sprocket 160 is mounted on the inner end of their respective picker unit drive shafts 159 to cause said shaft to rotate. As may be noted in FIGURE 5 the inner end of each drive shaft is located over the central portion of the elevating auger housing and extends outwardly beyond the end brace plates 54.

The picker unit drive shaft is parallel to the transverse beam 36 and is mounted thereabove. The drive shafts 159 are journalled in appropriate structure (not shown) mounted in the back portion of the support members 161 which extend rearwardly from the inner brace plates 52, the intermediate brace plates 53, and the end brace plates 54.

Each of the inner snapping rolls 66 and outer snapping rolls 65 have inner and outer shafts extensions 167, 168 respectively which extend rearwardly through the back plates 50 and are journalled therein in a suitable manner. Each of the outermost inner shaft extensions 167 and the innermost outer shaft extensions 168 are elongated to extend within close proximity of the picker unit drive shaft 159. A bevel gear 165 mounted on the shafts 159 drives the bevel gear 166 mounted on the rear end portion of the aforementioned shaft extension that extend adjacent the shafts 159.

A drive spur gear 171 which is mounted on the elongated shaft extensions 167, 168 between the back plate 50 and the bevel gear 166 drives the driven spur gear 172 when the picker unit drive shaft 159 is rotated. The driven spur gear 172 is mounted on the outer end portion of the outer shaft extension 168, 167. Through the aforementioned gear extensions the cooperating pairs of snapping rolls 65, 66 are rotated in opposite directions toward each other.

As may be noted on FIGURE 5 the bevel gears 165 for a single picker unit drive opposite snapping rolls on opposite sides of the unit. By mounting the aforementioned bevel gears 166 on opposite snapping rolls in each of the two row corn picker units, the snapping rolls are driven in the proper direction even though the end sprockets 160 are located adjacent one another and are driven through appropriate connections mounted on the common inner shaft 149.

The spur gears 171, 172 also drive the inner gathering chain drive sprockets 173 which are mounted on the rear portion of the connecting shaft 175, there being a coil spring bearing against the structure mounting the sprocket and an appropriate collar mounted on the rearward portion of said connecting shaft, the coil spring and collar not being illustrated. Similarly, the spur gears 171, 172 drives the outer gathering chain drive sprocket 174 which is mounted on the rear portion of the connecting shaft 176.

The outer connecting shaft 176 extends through an appropriate aperture formed in the back wall 50 and forwardly at an angle of inclination approximately the same as the angle of inclination of the snapping rolls. The forward end of the connecting shaft is journalled in the mounting member 177 and extends therethrough. Mounted on the forward end portion of the connecting shaft is a bevel gear 183 which drives the bevel gear 184 mounted on the lowered end of the upright shaft 179. The lower end of the upright shaft is journalled in bracket 180.

A gathering chain sprocket 185 is keyed on the upper end of the upright shaft to drive the gathering chain 70 which is carried over sprocket 186. The sprocket 186 is mounted on a short shaft 181, said short shaft being journalled in the shafts mounting elements 182 which are secured to and extend forwardly of the longitudinal brace 43. Thus a driving connection is provided from the header shaft 149 to the gathering chain 70 through the aforementioned elements.

Mechanical drive connections are made from the inner connecting shaft 175 to the inner gathering chain 69 similar to those between the connecting shaft 176 and the outer gathering chain 70. Of course, one difference is that the outer connecting shaft 176 would be longer than the connecting shaft 175, this being necessary since the forward ends of the gathering chains are approximately the same elevation above ground and the same distance from the transverse frame; however, the gathering chain 69 is considerably shorter than the gathering chain 70. Another difference is that there is appropriate driving connections made for a second short gathering chain mounted above gathering chain 69, said short gathering chain being conventional and therefore is not illustrated or described. Thus, by providing the above described bevel gear 165 on the shaft 159, the connection between the inner and outer gathering chain drive sprockets 173, the spur gears 171, 172 and bevel gear 166 along with the other above described mechanical drive mechanism, the adjacent pair of snapping rolls 65, 66 and gathering chains 69 and 70 will be rotated in opposite directions to form mechanism for snapping the ears of corn off the stalk.

The mechanism for driving the snapping rolls and the gathering chain having been described, the drive mechanism for the transverse augers will now be set forth. Mounted inwardly on the picker unit drive shaft 159 adjacent the supporting member 161 is an outer end sprocket 191 (see FIGURE 2). The drive chain 192 drivenly connects the outer end sprocket to the intermediate sprocket 193 which is located at a lower elevation than the transverse beam.

The intermediate sprocket is mounted on a short horizontal shaft 198 which is journalled in short arm 200, and the vertical arm 195. The vertical arm 195 is mounted on the outer edge of the transverse beam 36 to depend therefrom, and the short arm 200 is welded at upper edge portion to the transverse beam to extend downwardly therefrom and positioned to be intermediate the vertical arm and the transverse auger housing end wall 61. The shaft 198 is mounted at approximately the same elevation as the bottom or curved portion of the transverse auger housing. Keyed on the portion of the shaft that extends between the short arm and the end wall is a sprocket 197.

Mounted in the same vertical plane as the sprocket 197 are idler sprocket 201 and a reversing sprocket 208, the reversing sprocket being mounted on the shaft 209 which is journalled in a mounting bracket 210 that is secured to the lower end wall 61 of transverse auger housing. The idler sprocket 201 is mounted forwardly and at a slightly higher elevation than the reversing sprocket, said idler sprocket being mounted on a shaft 199 which is journalled in a bracket (not shown) secured to the end wall 61. The three sprockets, the sprocket 197, the idler sprocket 201 and the reversing sprocket 208 are mounted at the apexes of a triangle formed by drawing lines between the three sprockets. Mounted in the same vertical plane as the three sprockets and within the triangle space bounded said sprockets is a transverse auger sprocket 207. The transverse auger drive chain 204 is extended over the sprocket 197 then to the opposite side of the transverse auger sprocket 207, next over the reversing sprocket 208, thence over the idler sprocket 201 and back to sprocket 197. As a result of the aforementioned mounting of the chain 204, the transverse auger sprocket 207 is rotated in a direction opposite to the direction of rotation of the short horizontal shaft 198.

The transverse auger sprocket 207 is mounted on the outer end of the transverse auger shaft 94, said shaft extending outwardly through appropriate apertures formed in the end walls 61 to be journalled in appropriate structure mounted in the lower end portion of the vertical arm 195. By extending the auger shaft 94 outwardly to the vertical arm it has not been found necessary to provide structure in addition to the auger housing for rotatably supporting the inner end of the auger shaft adjacent the elevating auger housing.

Keyed on the auger shaft adjacent the transverse auger sprocket 207 and outwardly therefrom is a small sprocket 205. The small sprocket 205 is drivenly connected to the belt sprocket 203 by a belt drive chain 206. The belt sprocket 203 is mounted on the outer end of the belt drive shaft 84 which is parallel to and forwardly of the transverse auger shaft 94. By using the above described mechanical drive connection, all the rotating or moving elements of the corn header attachment are moved in timed relationship.

A guard 213 which is secured by appropriate braces to the short arm 200 and to the transverse auger housing provides a shield to minimize the amount of material that comes in contact with the sprockets that are mounted adjacent the end wall 61. The guard 213 has an end wall 213a which is parell to the end wall 61 and spaced on the opposite side of the transverse auger sprocket from said end wall. The guard also has a forward portion 213b and a horizontal portion generally parallel to the ground 213c.

The drive connections for each of the two two-row corn picker units are similar except for the difference pointed out. The mechanical drive connections for operating the two two row corn picker units 62 having been described, the mechanism for driving the elevating auger units 216, 220 will now be set forth. Referring to FIGURES 3, 4, and 6 it may be seen that the elevating auger pulley casing 225 is mounted at the upper forward portion of the elevating auger housing 25 to extend forwardly thereof. It is to be noted in FIGURE 6 that a portion of the pulley casing 225 is not illustrated in order that the structure for driving the elevating augers may be more clearly shown. The large pulley 224 is journalled in the pulley casing to have its axis of rotation substantially parallel to the axis of rotation of the elevating auger and located thereabove. The structure for journalling the large pulley includes the hub mounting member 219 that extends forwardly of the aforementioned casing. A pulley sprocket 229 is keyed to the shaft mounting the large pulley to be rearward of the large pulley.

The shafts 217, 221 of the left hand elevating auger 216, and the right hand elevating auger 220 respectively, each have forwardly extending portions that extend through appropriate apertures formed in the end wall 103 of the elevating auger housing 25. Mounted on the forward extensions of the elevating auger housing shafts are hub mounting members 219 that retain the elevating auger sprockets 218, 222 on the shafts 217, 221 respectively. The pulley sprocket which is mounted inwardly on the pulley sprocket shaft (not shown) of the large pulley 224 lies in the same general plane as the elevating auger sprockets 218, 222. Also mounted in the same aforementioned plane is a reversing sprocket 223, said sprocket being keyed on a shaft 227 which is journalled in an appropriate bracket (not shown), said bracket being secured to the end wall 103. An elevating auger drive chain 234 is extended over the pulley sprocket 229, thence around the reversing sprocket 223, then over the top of the left hand elevating auger sprocket 218, thence downwardly and around the under portion of the right hand drive sprocket 222 and finally upwardly to the aforementioned pulley sprocket 229. By extending the drive chain 234 around the sprockets in the aforementioned manner, the transverse augers are rotated in the opposite direction inwardly towards each other as indicated by arrows 230, 231.

Mounted parallel to and above the beam 36 is a short horizontal support member 248, said support member being secured to appropriate braces located between the adjacent curved side shields 63. Secured to the support members 248 and extending forwardly thereof in substantially the same plane is a generally V-shaped bracket 240, the V-shaped bracket having an apex portion 239 in which a threaded belt tightening rod 241 may be slideably mounted.

The belt tightening member 241 has an appropriate coupling member 239 which is rotatably pivoted in the pivot bracket 246. At the opposite end of the coupling member is an angle bolt 238 which is threaded at both ends, one end of which is threaded into the coupling member. A locking nut 237 is threaded onto one end of the angle bolt for retaining the bolt in an adjustably fixed position relative to the coupling member. The bent end 238a of the angle bolt is threaded and extends through the apex portion 239 of the V-shaped bracket. Appropriate spaced locking nuts 244 are threaded onto the angle bolt such that the V-shaped portion is retained therebetween. Thus by turning the locking nut 237 in the proper direction, the angle bolt may be moved outwardly relative to the coupling member and thus force the angle portion 238a forwardly in the V-shaped bracket. By tightening the locking nuts 244, the angle portion 238a will be retained in the previous mentioned adjusted position.

Mounted between the upper locking nut 244 and the top edge of the apex portion 239 is a general U-shaped bracket 242, said U-shaped bracket having appropriate aperture formed therein such that it may be mounted on the angle bolt 238. The general plane of the U-shaped bracket is nearly parallel to the horizontal support member 248. An angle pulley 243 is journalled for rotation on each of the outer portions of the legs of the U-shaped bracket, said angle pulleys being mounted to slant upwardly and inwardly toward a vertical plane passed through the elongated auger housing. The angle pulleys are rotatably secured to the respective legs by appropriate mounting structure 247.

A pulley bracket 250 is secured to the transverse bar 35 to extend upwardly and rearwardly therefrom. An idler pulley 249 is journalled in the pulley bracket, said pulley functioning to keep the elevating auger drive belt 226 from rubbing on the transverse bar.

The elevating auger drive belt 226 is extended around the top portion of the elevating auger drive pulley 155, then downwardly over the left hand angle pulley 243, next around the bottom portion of the large pulley 224, and then upwardly over the right hand angle pulley 243. From the right hand angle pulley, the drive belt extends upwardly over the idler pulley 249 and then around the bottom portion of the elevating auger drive pulley 155.

Appropriate control members 256 are provided for raising and lowering the corn header attachment, for steering the corn picker, and for starting and stopping the drive which rotates the corn header attachment members along with various other conventional control means. The aforementioned control members being conventional and not forming a part of this invention, they will not be further described.

The structure of the invention having been described, a short description of the operation thereof will now be set forth. Once the corn header attachment 11 has been pivotally mounted on the combine 10 at points A and B and the other appropriate connections have been made, the header attachment may be raised to a carrier or transport position through manipulation of the appropriate lever 256 which results in actuation of the piston cylinder combination 29, 13 for raising said header attachment (see FIGURE 1). Once the corn picker 9 has been taken to the field of corn to be picked, the vertical elevation of the attachment may be appropriately adjusted.

If the field happens to be extremely rough, it may be desirable to hold the attachment slightly above the ground such as is shown in FIGURE 3. However, by allowing the attachment to ride on the ground or appropriate shoes (not shown), the inner and outer floating snouts 67, 68 gather in the down, lodged meandering stalks, while the low angle of the snapping rolls and gathering chains allow the attachment to pick up the down and lodged corn. The long snapping rolls and gathering chains operate to pick the ears of corn from the stalks and carry them toward the transverse frame in a conventional manner.

The conveyor belt 81 which is mounted beneath the hood 71 extends forwardly to be at elevation at approximately a third of the height of the vertical elevation of the snapping rolls when the attachment is in the lowermost position. Also the conveyor belt extends sufficiently forward such that its forward corn receiving portion is within one third of the length of the snapping rolls to the forward edge of the snapping rolls. As previously mentioned, the inclined wall 59 and the rearward edges of the divider shield 64 extends slightly rearwardly of conveyor cylinder shaft 85. Any corn that has been carried past the vertical rear edges of the divider shield may fall from the snapping rolls down onto the conveyor belt. Also the fact that the outer snapping roll is at a height higher than the inner snapping roll, the corn is directed inwardly toward the belt. The shoulder 76 which is overhung by the inner snapping rolls 66 directs the corn inwardly onto the conveyor belt and prevents loss of kernels of corn between said belt and the inner snapping rolls.

The conveyor belt 81 is sloped or inclined upwardly and rearwardly to extend over the forward edge of the transverse auger housing, the amount of inclination being sufficient to raise the level of the picked corn but at the same time not being too steeply inclined to result in loss of corn over the forward edge portion thereof. As may be noted, for example, in FIGURE 3 the back wall 57 of the transverse auger housing extends upwardly above the elevation of the conveyor belt. The back wall 57 is sufficiently high to prevent loss of corn which is delivered into the transverse auger housing.

The transverse augers 92, 94 are rotated so that the corn moves inwardly to the elevating auger housing 25. As may be noted from FIGURE 3, corn is delivered to the elevating augers 216, 220 at a very low elevation, the lower forward end of the elevating auger being very closely adjacent to the ground. By providing transverse augers that feed to the intermediate elevating augers, a smaller size auger may be used than would be necessary if only a single transverse auger were provided and extend across the transverse width of the corn header attachment. It has been found that the elevating augers need only have a diameter that is one and one third times the diameter of the transverse auger in order to handle all the corn delivered to it by said transverse augers.

By providing a conveyor belt between the adjacent pair of inner and outer snapping rolls sufficient carrying capacity is provided for taking the picked ears from the snapping rolls. Thus there is no "lagging" of picked ears on the snapping rolls, even though the yield per acre is high and the combine speed is not reduced.

The elevating augers 116, 220 are mounted to have their inner edges overlapped and are driven in time relationship in opposite directions and inwardly toward one another (see arrows 231, 232), so that the corn moves in an upward direction without being crushed or falling back toward the transverse augers. By providing the double augers and an enclosed auger housing, the corn may be elevating at a relatively steep angle with an even flow and no loss of corn. Thus by providing duel interlocking augers, a right hand and a left hand auger, the corn may be readily elevated to an angle of approximately 55°–60°.

The elevating auger housing extends upwardly through aperture 119 to deliver the corn into the central transverse portions of the sheller cylinder 115. As previously mentioned the closure member 120 provides sufficient room for delivering the corn through the path of travel 275 into the sheller cylinder.

By providing the aforementioned conveyor system for elevating the corn from a relatively low elevation as it is taken off the snapping rolls through the path of travel indicated by arrow 275 up into the sheller cylinder, substantially no severed ears or kernels of corn are lost from the time the corn falls off the snapping rolls onto the conveyor belts. Further, using the conveyor system of the invention, leaves and trash do not clog the path of travel 275 of corn which would require the slowing down and/or stopping and cleaning the corn header attachment.

As previously mentioned, the diameter of the elevating auger is larger than the diameter of the transverse auger, thus there is sufficient conveying capacity provided for picking four rows of corn simultaneously without having to slow the combine. Picking four rows of corn simultaneously provides an advantage in that each side of the attachment extends outwardly to pick an extra row of corn beyond the combine over two row pickers and thus the combine does knock down the standing row adjacent to the combine. This feature is especially important when the field is being opened. At the same time the conveying system of this invention provides a cross conveyor of relatively low elevation which is closely adjacent to the front wheel of the combine on which the corn header attachment is mounted. Thus using the apparatus described, a combine may be used to double the picking and shelling capacity of corn pickers using a single two row header.

Although one type of combine has been illustrated and described in part it is to be understood that the invention is not to be limited in use to the make of combine illustrated. Further, one specific means of driving the various elements of the conveyor system has been set forth, however, it is to be understood that this does not preclude the use of the variations of the drive mechanism used provided the functions and operation of the invention is not changed.

Further, it is to be understood that the various drive means drive through a plurality of slip clutches (not shown) as an added safety feature. Additionally, for the most part the structure journalling the various shafts includes sealed bearings.

As many widely apparent different embodiments of this invention may be made without departing from the spirit and scope thereof, it is to be understood that I do not limit myself to the specific embodiments herein.

What I claim is:

1. A self-powered wheeled vehicle having a vehicle frame and a shelling and cleaning section on said vehicle frame, a transverse frame mounted on the front portion of said vehicle frame, a pair of two row corn picking units mounted on the transverse frame in side-by-side relation and extending forwardly of said transverse frame, each of said units including a picker unit frame, two spaced snapping roll means mounted on said picker unit frame for severing ears of corn from upstanding corn stalks and means mounted on the picker unit frame for receiving the severed ears from the snapping roll means and delivering said severed ears rearwardly, and means secured to a transverse frame for receiving the severed ears from each of the means for receiving severed ears from the snapping roll means and elevating said severed ears to said cleaning and shelling section, said receiving and elevating means including means for elevating severed ears through a relatively steep angle of inclination to the cleaning and shelling section and transverse means for receiving the severed ears from each of the means for receiving severed ears from the snapping roll means and delivering the ears to the elevated means, said transverse means including a transverse auger housing extending inwardly to the elevating means, said transverse auger housing having end walls, and a pair of spaced transverse augers mounted in said transverse housing, each auger having a shaft extending outwardly through an end wall and solely journalled for rotation in the end wall, and drive means for driving each of the augers.

2. The apparatus of claim 1 further characterized in that the means for receiving ears from each snapping roll means includes a conveyor apron mounted to receive the separate ears of corn from the snapping roll means and delivering them to the transverse auger housing.

3. Apparatus for picking and shelling corn comprising a self propelled wheeled combine having a shelling section with an opening at an elevation relatively high above the ground, a frame secured to said combine and extending forwardly of said combine, four longitudinally extending, transversely spaced sets of cooperating pairs of upwardly and rearwardly inclined snapping rolls mounted on the frame for simultaneously severing ears of corn from four rows of upstanding stalks of corn, said sets including a first, a second, a third and a fourth set of snapping rolls, first conveyor belt means mounted on the frame between said first and second sets of snapping rolls and at a lower elevation than the adjacent portion of the snapping rolls for receiving severed ears of corn and delivering said severed ears rearwardly, second conveyor belt means mounted on the frame between said third and fourth sets of snapping rolls at a lower elevation than the adjacent portion of said snapping rolls for receiving severed ears of corn and delivering said severed ears rearwardly, a transverse auger housing mounted on the frame directly behind and immediately below the rearward end of said first and second conveyor means for receiving the severed ears from said first and second conveyor means, first transverse auger means mounted in said transverse housing for delivering severed ears from the first conveyor means inwardly toward the center portion of said transverse housing, second transverse auger means mounted in said transverse housing for delivering severed ears received from said second conveyor means inwardly toward the center portion of said transverse housing, and elevating means connected to the center portion of said transverse housing to receive severed ears from said transverse housing and elevate said ears in through said opening, said elevating means including a pair of interlocked augers having lower ends mounted to extend into said transverse housing and means to drive said interlocked augers in timed relation.

4. The apparatus of claim 3 further characterized in that the conveyor belt means is mounted on the frame to have a forward end at an elevation less than one half the height of the snapping rolls and rearwardly inclined at an angle less than 30° to the horizontal, that the inner ends of said transverse auger means are transversely spaced and the lower ends of said interlocking augers are mounted at approximately the same elevation as the inner ends of the transverse auger means and between said inner ends of the transverse auger means and the elevating means includes an auger housing inclined upwardly at an angle greater than 45° to the horizontal and having the interlocking augers located therein, the interlocking auger housing having a lower end secured to the center portion of the transverse auger housing and an upper end extending into said opening.

References Cited in the file of this patent

UNITED STATES PATENTS

| | | |
|---|---|---|
| 1,881,470 | Gentry | Oct. 11, 1932 |
| 1,968,998 | Elliott | Aug. 7, 1934 |
| 2,217,872 | Lindgren et al. | Oct. 15, 1940 |
| 2,337,592 | Coultas et al. | Dec. 28, 1943 |
| 2,351,807 | Court | June 20, 1944 |
| 2,518,302 | Gerber | Aug. 8, 1950 |
| 2,536,148 | Andrews | Jan. 2, 1951 |
| 2,833,287 | Sammarco et al. | May 6, 1958 |
| 2,848,861 | Ketelhut | Aug. 26, 1958 |
| 2,894,364 | Ehler | July 14, 1959 |